United States Patent [19]

Evani

[11] Patent Number: 4,814,096

[45] Date of Patent: Mar. 21, 1989

[54] ENHANCED OIL RECOVERY PROCESS USING A HYDROPHOBIC ASSOCIATIVE COMPOSITION CONTAINING A HYDROPHILIC/HYDROPHOBIC POLYMER

[75] Inventor: Syamalarao Evani, Midland, Mich.

[73] Assignee: The Dow Chemical Company, Midland, Mich.

[21] Appl. No.: 518,877

[22] Filed: Aug. 1, 1983

Related U.S. Application Data

[63] Continuation-in-part of Ser. No. 232,327, Feb. 6, 1981, Pat. No. 4,432,881.

[51] Int. Cl.$^4$ ................. C09K 7/02; E21B 43/22; E21B 43/26
[52] U.S. Cl. .................. 252/8.554; 166/270; 166/275; 252/8.514; 524/375; 524/376
[58] Field of Search .............. 252/8.5 A, 8.55 D; 166/274, 275, 270; 523/130, 131; 524/375, 376

[56] References Cited

U.S. PATENT DOCUMENTS

| | | | |
|---|---|---|---|
| 3,350,338 | 10/1967 | Savage | 523/207 |
| 3,583,486 | 6/1971 | Stratton | 252/8.55 D |
| 3,724,547 | 4/1973 | Bott | 166/274 |
| 3,739,848 | 6/1973 | Lawson | 252/8.55 D |
| 3,744,566 | 7/1973 | Szabo et al. | 252/8.55 D |
| 3,891,591 | 6/1975 | Chang et al. | 524/144 |
| 3,948,783 | 4/1976 | Szabo et al. | 252/8.55 D |
| 3,984,333 | 10/1976 | van de Kraats et al. | 252/8.55 D |
| 4,110,232 | 8/1978 | Schwab et al. | 252/8.55 B |
| 4,222,881 | 9/1980 | Byham et al. | 252/8.55 D |

FOREIGN PATENT DOCUMENTS 0013836  8/1980  European Pat. Off. .

*Primary Examiner*—John F. Terapane
*Assistant Examiner*—Virginia B. Caress

[57] ABSTRACT

An aqueous liquid medium having increased low shear viscosity and utility as a mobility control agent in enhanced oil recovery is provided by dispersing into the aqueous medium (1) a hydrophilic/hydrophobic polymer having hydrophobic groups, e.g., an acrylamide/dodecyl methacrylate copolymer, and (2) a water-dispersible surfactant, e.g., dodecyl polyethyleneoxy glycol monoether.

18 Claims, No Drawings

ENHANCED OIL RECOVERY PROCESS USING A HYDROPHOBIC ASSOCIATIVE COMPOSITION CONTAINING A HYDROPHILIC/HYDROPHOBIC POLYMER

CROSS-REFERENCE TO RELATED APPLICATION

This application is a continuation-in-part of application Ser. No. 232,327, filed Feb. 16, 1981, now U.S. Pat. No. 4,432,881.

BACKGROUND OF THE INVENTION

This invention relates to aqueous flooding processes, wherein polymers are dispersed in an aqueous liquid and thereby provide mobility control.

Enhanced oil recovery (EOR) by flooding has become widely practiced by the petroleum industry. In conventional enhanced oil recovery processes, an aqueous flooding liquid is injected into the subterranean formation through a pattern of injection wells which surround one or more producing wells. The flooding liquid acts as an oil-immiscible front which displaces oil from the formation and forces it to the production well. In order to maximize the displacement efficiency of the flooding liquid, it has been a practice to add various materials to the medium to increase its viscosity.

As taught in *Encyclopedia of Polymer Science and Technology*, Interscience Publishers, Vol. I, 192 (1964), it is known that the viscosity of an aqueous medium is increased by the addition of a water-soluble polymer. Such water-soluble polymers include polyacrylamide, acrylamide/acrylic acid copolymer, sodium polyacrylate, carboxymethyl cellulose, hydroxyethyl cellulose, methyl cellulose, polysaccharide as well as naturally occurring gums such as guar gum and chemically modified gums such as hydroxypropyl guar gum.

Unfortunately, however, the aforementioned conventional water-soluble polymers suffer from many serious deficiencies or limitations in actual use in enhanced oil recovery. For example, for reasons of efficiency and economical considerations, it is common to employ very high molecular weight versions of such polymers. However, during the injection stage of the EOR process (i.e., the pumping of the liquid into the formation), the aqueous medium containing the high molecular weight water-soluble polymer is exposed to high shear. Such shear often causes mechanical degradation of the polymer and thus reduces the viscosity of the aqueous medium. While lower molecular weight polymers are less sensitive to shear degradation, they must be used in much higher concentrations in order to achieve the desired level of viscosity.

Secondly, while ionic water-soluble polymers such as neutralized acrylamide/acrylic acid copolymer, sodium polyacrylate, polystyrene sulfonate and the like are more efficient thickeners in deionized water than their nonionic counterparts, their thickening ability is greatly reduced by the presence of electrolytes such as sodium chloride, calcium chloride and magnesium sulfate in the aqueous medium. Such electrolytes are commonly present in the ground waters (brines) of subterranean formations subjected to EOR process.

Finally, in many EOR processes, the aqueous medium thickened with water-soluble polymer is exposed to temperatures in the range of 30° C. to 100° C. which normally causes reduction of viscosity. Such high temperatures are particularly common in EOR processes wherein the aqueous medium is pumped underground to depths of 5,000 to 20,000 feet, as is common for mobility control fluids and packing fluids.

In attempts to overcome some of the aforementioned deficiencies of the conventional water-soluble polymers, it has been a common practice to cross-link the polymer in order to improve resistances to thermal as well as shear degradation. See, for example, U.S. Pat. No. 3,247,171. Such attempts have generally not been successful. More recently, as taught in U.S. Pat. No. 3,984,333, an aqueous medium has been thickened by dissolving a water-soluble block copolymer having water-soluble blocks and water-insoluble blocks in the aqueous medium. While such water-soluble block copolymers apparently exhibit reasonably good resistance to shear degradation, such polymers are difficult and often impractical to prepare. More importantly, such polymers do not exhibit significant tolerance of electrolytes normally present in the aqueous media to be thickened.

While the cellulosic derivatives such as hydroxyethyl cellulose and biopolymers exhibit acceptable tolerance to the presence of electrolytes, cellulosic derivatives are generally ineffective at the low concentrations that are economical and exhibit poor thermal stability. The biopolymers such as xantham gums exhibit acceptable thermal stability, resistance to shear degradation and electrolytic tolerance. Unfortunately, such biopolymers are generally very expensive and are susceptible to biodegradation.

In view of the aforementioned deficiencies of conventional water-soluble polymers as mobility control agents in enhanced oil recovery process, it is highly desirable to provide an inexpensive EOR process which employs an agent which exhibits thermal stability, electrolytic tolerance and good resistance to shear and biological degradation.

SUMMARY OF THE INVENTION

The present invention is such an EOR process which comprises forcing an aqueous flooding medium from an injection well through a subterranean formation toward a producing well wherein the flooding medium contains a mobility control agent which is soluble in the medium and which is a hydrophobic associative composition comprising (1) a hydrophilic/hydrophobic polymer having hydrophobic moieties and (2) a water-dispersible surfactant having hydrophobic groups that are capable of associating with the hydrophobic moieties of the polymer. The relative proportions of the two components of the control agent are such that, when the mobility control agent is dispersed in water in a concentration of 0.5 weight percent based on the water, the viscosity of the water is at least doubled.

Surprisingly, aqueous media containing the mobility control agent of this invention can be subjected to substantial mechanical shear without a significant loss of viscosity. Moreover, such agents provide a substantial and further increase in viscosity when the aqueous media contains significant concentrations of electrolyte as in the case of hard water or brine and even when exposed to temperatures up to 80° C. Consequently, such agents can be used in a wide variety of environments wherein high temperatures, substantial electrolyte concentrations and conditions of high mechanical shear such as in high shear pumping of the aqueous medium is required.

Unlike high molecular weight polymers currently used as mobility control agents which thicken an aqueous media but which also give solutions which are stringy, the mobility control agents of the invention when dispersed in an aqueous medium, exhibit pseudo plastic rheology and short solution characteristics. By "short solution characteristics" is meant that an aqueous medium containing the agent does not produce threads or strings of such aqueous medium when surfaces wetted with the medium are contacted and pulled apart.

As a result of these and other viscosity enhancing characteristics of the present invention, these agents are also useful in other oil field applications which require aqueous media having increased viscosity such as drilling mud formulations, fracturing fluids and the like. In addition, the mobility control agents of the present invention exhibit higher resistance factors and more uniform resistance factor response with flow rate than do conventional mobility control agents such as high molecular weight polymers of acrylamide.

Accordingly, in another aspect, the present invention is an aqueous medium containing an amount of the mobility control agent which is effective to increase the viscosity of the aqueous medium. In a preferred embodiment of this aspect of the invention, the aqueous medium containing the agent has sufficient rheology to act as a mobility control fluid useful in enhanced oil recovery operations. In the practice of this embodiment of the invention, the mobility control fluid is introduced through an injection well into a porous subterranean formation penetrated by said well and driven through the formation through the producing well.

In a further aspect of this invention, the aforementioned mobility control agent is employed as a component in a caustic flooding fluid or the aforementioned mobility control fluid is employed prior to or subsequent to a caustic flood in an enhanced oil recovery process.

In yet further aspects of this invention, the agent is employed in a drilling mud formulation or a fracturing fluid wherein the agent is present in an amount sufficient to control the rheology of the formulation or fluid as desired.

A final aspect of this is a method for preparing the mobility control agent which comprises copolymerizing a water-soluble, ethylenically unsaturated monomer with a water-insoluble, ethylenically unsaturated monomer having a hydrophobic moiety in an aqueous medium in the presence of the water-dispersible surfactant under conditions sufficient to form the agent.

DETAILED DESCRIPTION OF THE ILLUSTRATIVE EMBODIMENTS

The mobility control agent of this invention is a hydrophobic associative composition which is soluble in an aqueous medium consisting of water, 0.2 weight percent of sodium chloride and 0.01 weight percent of a water-dispersible surfactant similar to the surfactant of the composition, both percentages being based on the medium. For the purposes of this invention, a hydrophobic associative composition is soluble in the aforementioned aqueous medium if 0.5 weight parts of the composition forms a thermodynamically stable solution when it is intimately mixed with 100 weight parts of the aqueous medium. Such solutions form spontaneously in the aqueous medium and include (1) true solutions in which the individual polymer and surfactant molecules are dispersed as well as (2) micellular or colloidal solutions wherein the polymer and surfactant molecules are aggregated to some extent, but wherein such aggregates are no larger than colloidal size.

By "hydrophobic associative" is meant that, in aqueous media, the hydrophobic moieties of the polymer and surfactant associate thereby increasing the viscosity of the aqueous medium. Additionally, it is observed that this property of hydrophobic association is even further enhanced by addition of a water-soluble electrolyte to the aqueous medium. It is observed this further enhancement (increase) of viscosity resulting from addition of salt occurs in absence of any precipitation or phase separation. In fact, if such phase separation or precipitation occurs upon addition of salt or electrolyte, the composition is not desirable in the practice of this invention.

For the purposes of this invention, the hydrophilic/hydrophobic polymer is predominantly hydrophilic, but contains a sufficient concentration of suitable hydrophobic moieties to enable it to associate with the hydrophobic moieties of the surfactant in an aqueous medium to cause an increase in viscosity of the aqueous medium. The molecular weight of the hydrophilic/hydrophobic polymer is low enough such that an aqueous medium containing 0.1 weight percent of the polymer can be subjected to a degree of shear on the order of 10,000 sec$^{-1}$ without causing the polymer to degrade significantly. Moreover, the polymer has a molecular weight such that, when 0.5 weight part of the polymer and 0.5 weight part of the surfactant are dissolved in 100 weight parts of water, the Brookfield viscosity of the water is increased to at least 2 centipoises (as measured using a Brookfield LVT viscometer equipped with a UL adaptor and operated at 6 rpm and 25° C.). While polymers having very high molecular weight, e.g., weight average molecular weight ($M_w$) greater than 5 million, can be suitably employed, such polymers tend to degrade when subjected to high shear, e.g., in excess of 10,000 sec$^{-1}$. Accordingly such polymers are less preferred for some applications. Preferably, the hydrophilic/hydrophobic polymers used in this invention have weight average molecular weights ($M_w$) as determined by intrinsic viscosity method in the range from about 200,000 to about 5 million, most preferably from about 800,000 to about 2.5 million.

The hydrophobic groups of the hydrophilic/hydrophobic polymer are preferably pendant organic groups having hydrophobicities comparable to one of the following: aliphatic hydrocarbon groups having at least 4 carbons such as $C_4$ to $C_{20}$ alkyls and cycloalkyls; polynuclear aromatic hydrocarbon groups such as naphthyls; alkylaryls wherein alkyl has 4 or more carbons, preferably 4 to 8 carbons; haloalkyls of 4 or more carbons, preferably perfluoroalkyls; polyalkyleneoxy groups wherein alkylene is propylene or higher alkylene and there is at least 1 alkyleneoxy unit per hydrophobic moiety. The concentration of hydrophobic moieties in the hydrophilic/hydrophobic polymer is that which is sufficient to increase the viscosity of an aqueous medium containing the water-dispersible surfactant and one weight percent of sodium chloride based on the medium. Preferably, the concentration of hydrophobic groups in the polymer is such that, when 0.5 weight part of the polymer is dissolved in 100 weight parts of the aqueous medium containing at least 0.01 weight part of the surfactant and at least one weight part of sodium chloride, the Brookfield viscosity (as defined hereinbefore) of the aqueous medium is substantially higher than that of a similar aqueous medium except that the polymer that is identical in all aspects to the hydrophilic/hydrophobic polymer except that it contains no hydrophobic groups. For example, if an aqueous solution containing one weight percent of a surfactant, one weight percent of sodium chloride and one weight percent of polyacrylamide (hydrophilic polymer) has a Brookfield viscosity of 10 cps, the aqueous solution containing one weight percent of the same surfactant, one weight percent of sodium chloride and one weight percent of a suitable hydrophilic/hydrophobic polyacrylamide, e.g., an acrylamide/dodecyl acrylate copolymer having a $M_w$ equivalent to the polyacrylamide, will have a Brookfield viscosity of at least 20 cps.

Exemplary hydrophilic/hydrophobic polymers include the copolymers of water-soluble ethylenically unsaturated monomers with hydrophobic ethylenically unsaturated monomers wherein the concentration of hydrophobic monomer is sufficient to provide the requisite concentration of hydrophobic moieties (groups). Preferably, the hydrophilic/hydrophobic polymer is a copolymer of from about 90 to about 99.995, more preferably from about 98 to about 99.995, most preferably from about 99 to about 99.9, mole percent of one or more water-soluble monomers with from about 0.005 to about 10, more preferably from about 0.005 to 2, most preferably from about 0.1 to about 1, mole percent of one or more hydrophobic monomers. For the hydrophilic/hydrophobic polymers, it is found that preferred amounts of hydrophobic monomers will vary with the molecular weight of the polymer. For example, a polymer having a weight average molecular weight near 200,000, preferably contains from about 1 to about 2 mole percent of hydrophobic monomer. Alternatively, a polymer having a weight average molecular weight of 2 million preferably contains from about 0.05 to about 0.25 mole percent of hydrophobic monomer.

Suitable water-soluble monomers include those which are sufficiently water-soluble to form at least a 10 weight percent solution when dissolved in water and readily undergo addition polymerization to form polymers which are water-soluble. Exemplary water-soluble monomers include ethylenically unsaturated amides such as acrylamide, methacrylamide and fumaramide and their N-substituted derivatives such as 2-acrylamido-2-methylpropane sulfonic acid (AMPS), N-(dimethylaminomethyl)acrylamide as well as N-(trimethylammoniummethyl)acrylamide chloride and N-(trimethylammoniumpropyl)methacrylamide chloride; ethylenically unsaturated carboxylic acids such as acrylic acid, methacrylic acid, itaconic acid and fumaric acid; and other ethylenically unsaturated quaternary ammonium compounds such as vinylbenzyl trimethyl ammonium chloride, sulfoalkyl esters of unsaturated carboxylic acids such as 2-sulfoethyl methacrylate, aminoalkyl esters of unsaturated carboxylic acid such as 2-aminoethyl methacrylate, vinyl amines such as vinyl pyridine and vinyl morpholine, diallyl amines and diallyl ammonium compounds such as diallyl dimethyl ammonium chloride, vinyl heterocyclic amides such as vinyl pyrrolidone, vinylaryl sulfonates such as vinylbenzyl sulfonate as well as the salts of the foregoing monomers. Of the foregoing water-soluble monomers, acrylamide and combinations of acrylamide and acrylic acid, including salts of acrylic acid such as sodium acrylate or ammonium acrylate, are preferred. Acrylamide and combinations thereof with up to 75 mole percent of acrylic acid or salt thereof, based on total water-soluble monomer, are more preferred. Most preferred are polymers wherein the water-soluble monomer is a mixture of acrylamide with from about 5 to about 50 mole percent, especially from about 5 to about 30 mole percent of acrylic acid or salt thereof.

Suitable hydrophobic monomers include those which are (1) water-insoluble, i.e., less than 0.2 weight part of the hydrophobic monomer will dissolve in 100 weight parts water and (2) ethylenically unsaturated compounds having hydrophobic groups as defined hereinbefore. Exemplary hydrophobic monomers include the higher alkyl esters of $\alpha,\beta$-ethylenically unsaturated carboxylic acids such as dodecyl acrylate, dodecyl methacrylate, tridecyl acrylate, tridecyl methacrylate, tetradecyl acrylate, tetradecyl methacrylate, octadecyl acrylate, octadecyl methacrylate, ethyl half ester of maleic anhydride, diethyl maleate, and other alkyl esters derived from the reactions of alkanols having from 4 to 20, preferably from 8 to 20, carbon atoms with ethylenically unsaturated carboxylic acids such as acrylic acid, methacrylic acid, maleic anhydride, fumaric acid, itaconic acid and aconitic acid; alkylaryl esters of ethylenically unsaturated carboxylic acids such as nonyl-$\alpha$-phenyl acrylate, nonyl-$\alpha$-phenyl methylacrylate, dodecyl-$\alpha$-phenyl acrylate and dodecyl-$\alpha$-phenyl methacrylate; N-alkyl, ethylenically unsaturated amides such as N-octadecyl acrylamide, N-octadecyl methacrylamide, N,N-dioctyl acrylamide and similar derivatives thereof, $\alpha$-olefins such as octene-1, decene-1, dodecene-1 and hexadecene-1; vinyl alkylates wherein alkyl has at least 8 carbons such as vinyl laurate and vinyl stearate; vinyl alkyl ethers such as dodecyl vinyl ether and hexadecyl vinyl ether; N-vinyl amides such as N-vinyl lauramide and N-vinyl stearamide; and ar-alkylstyrenes such as t-butyl styrene. Of the foregoing hydrophobic monomers, the alkyl esters of acrylic acid, methacrylic acid, N-alkyl acrylamides and N-alkyl methacrylamides wherein alkyl has from 8 to 20 carbon atoms, and the ar-alkyl styrenes wherein alkyl has from 4 to 8 carbons such as t-butyl, are preferred. The alkyl methacrylates wherein alkyl has from 10 to 20 carbon atoms and t-butyl styrene are more preferred. Dodecyl methacrylate and N-dodecyl methacrylamide are the most preferred where hydrolysis is not a problem. In applications wherein hydrolysis is a problem such as in caustic floods, t-butyl styrene is most preferred.

The aforementioned hydrophilic/hydrophobic polymers containing hydrophobic moieties are advantageously prepared by copolymerizing the water-soluble monomers with hydrophobic monomers by any of the conventional polymerization techniques, typically those wherein the hydrophobic monomer or mixture of hydrophobic monomers is added with vigorous agitation to an aqueous solution of the water-soluble monomer or mixture of water-soluble monomers. This copolymerization is preferably accomplished in an aqueous medium containing an emulsifier for the hydrophobic monomer and a polymerization initiator capable of generating free-radicals. The emulsifier has the ability to solubilize the hydrophobic monomer in the aqueous medium, i.e., it enables the hydrophobic monomer to give the visual appearance of forming a clear homogeneous solution in the aqueous medium. Optionally a chain transfer agent may be included in the polymerization reaction mixture.

The emulsifier is required in most instances to suitably solubilize the hydrophobic monomer in the aqueous medium and to subsequently obtain a hydrophobic/hydrophilic polymer having a desirable concentration of hydrophobic moieties in the polymer. It is believed that the hydrophobic monomer is solubilized in the micelles formed by the emulsifier. Thus, the emulsifier is generally employed in a concentration which is above the critical micelle concentration (CMC) of the emulsifier, but less than that which reduces the concentration of hydrophobic monomer in the resultant hydrophilic/hydrophobic polymer to a point that the polymer will not associate with the hydrophobic groups of the water-dispersible surfactant. Preferably, the concentration of emulsifier in the aqueous polymerization medium is from about 2 to about 4 times the CMC of the emulsifier. The amount of emulsifier used will also be such that there is at least one hydrophobic monomer molecule per micelle of the emulsifier, preferably from about 2 to about 10, most preferably from about 4 to about 5, hydrophobic monomer molecules per micelle. For example, when sodium dodecyl sulfate (NaDS) is employed as an emulsifier for dodecyl methacrylate (DMA), the molar ratio of DMA to NaDS is at least 1:50, preferably from 1:5 to 1:25, most preferably from about 1:10 to about 1:15. By knowing the CMC, HLB and micelle molecular weight of an emulsifier and the hydrophobicity of the hydrophobic monomer, suitable molar ratios and appropriate emulsifier concentrations can be determined for any given hydrophobic monomer and emulsifier to provide similar suitable concentrations of hydrophobic moieties in the hydrophilic/hydrophobic polymer. In general, mole ratios of hydrophobic monomer to emulsifier are selected which will provide from about 2 to about 10 pendant hydrophobic moieties per micelle of the emulsifier in the polymerization medium.

Suitable emulsifiers include anionic agents such as alkali metal salts of alkyl sulfates and alkyl and aryl sulfates, e.g., dodecyl alkyl sulfosuccinates and sodium dodecylbenzene sulfate; fatty acid soaps, e.g., sodium oleate, sodium stearate and potassium oleate; alkali metal salts of sulfonated fatty alcohols, e.g., sodium dodecyl sulfate; sulfates of ethoxylated alcohols; alkyl phosphate esters, e.g., dodecyl hydrogen phosphate; fluoro emulsifiers, e.g., perfluoroalkyl sulfates; and the like. Also included are cationic emulsifiers such as alkylamine hydrochlorides, e.g., dodecylamine hydrochloride and tridecylamine hydrochloride; quaternary alkyl or aryl ammonium halides such as dodecyl trimethyl ammonium chloride, ethoxylated fatty amines and other emulsifiers as described in *McCutcheon's Detergents and Emulsifiers*, North American Edition, 1980 Annual. In general, when the hydrophilic/hydrophobic polymer is anionic or nonionic, an anionic emulsifier such as an alkali metal alkyl sulfate is preferably employed as the emulsifier. When the hydrophilic/hydrophobic polymer is cationic, a cationic emulsifier such as dodecylamine hydrochloride is employed. When the hydrophilic/hydrophobic polymer is nonionic, anionic or cationic, a nonionic emulsifier such as nonylphenoxy polyethylene glycol having 10 ethyleneoxy units per molecule or other water-dispersible nonionic surfactants as defined herein is suitably employed.

Exemplary suitable polymerization initiators include the inorganic persulfates such as potassium persulfate, ammonium persulfate and sodium persulfate, azo catalysts such as azobisisobutyronitrile and dimethyl azoisobutyrate; organic peroxygen compounds such as benzyl peroxide, t-butyl peroxide, diisopropyl benzene hydroperoxide and t-butyl hydroperoxide. Of these initiators, the oil-soluble types such as the organic peroxides and azo compounds are preferred. It is desirable to employ from about 0.01 to about 0.1 weight percent of initiator based on the monomers.

In an especially preferred embodiment, a nonionic surfactant as described hereinafter as the second component of the mobility control agent is added to the polymerization recipe as another component in addition to the emulsifier. It is found that the addition of the surfactant prior to and/or during polymerization provides a mobility control agent exhibiting a better resistance factor than when the surfactant is incorporated subsequent to polymerization.

The hydrophilic/hydrophobic polymers are readily recovered from the aqueus medium when such is desired by removal of water under vacuum or by azeotropic distillation or by drum drying. Alternatively, the aqueous medium containing the hydrophilic/hydrophobic polymer can be used as such.

It is also understood that hydrophilic/hydrophobic polymers of acrylamide, acrylic acid and hydrophobic monomer can be prepared by copolymerizng all three of these monomers or by copolymerizing acrylamide with the hydrophobic monomer and subsequently hydrolyzing a portion of the copolymerized acrylamide by contacting the copolymer with a base such as sodium hydroxide and/or sodium carbonate.

Surfactants suitably employed as a second component of the mobility control agents of this invention are those micelle forming surface active agents which will disperse in an aqueous medium containing an effective amount of the aforementioned hydrophilic/hydrophobic polymer and which have sufficient hydrophobic moieties to combine with the hydrophilic/hydrophobic polymer to increase the viscosity of an aqueous medium containing said hydrophilic/hydrophobic polymer and at least one weight percent of sodium chloride. Accordingly, such surfactants can be nonionic, anionic, cationic or amphoteric, with the nonionic surfactants being preferred due to their ability to remain hydrated in the presence of significant electrolyte concentration. Preferred nonionic surfactants have hydrophilic-lipophilic balances (HLB) in the range from about 2 to about 15, most preferably from about 5 to about 13. Exemplary surfactants include nonionic surfactants such as the reaction products of ethylene oxide or mixtures of ethylene oxide and higher alkylene oxide with active hydrogen compounds such as phenols, alcohols, carboxylic acids and amines, e.g., alkylphenoxyethyleneoxy ethanols. Preferred nonionic surfactants are the alkyl polyethyleneoxy compounds represented by the formula:

$$RO(EO)_n-H$$

wherein R is $C_8$-$C_{18}$ alkyl, EO is ethyleneoxy and n is a number from 1 to 10. Although less preferred than the nonionic surfactants, suitable anionic substituted polyethyleneoxy compounds are represented by the formula:

$$RO(EO)_n-X$$

wherein R and n are as defined hereinbefore, EO is ethyleneoxy and X is $SO_3H$ or $CH_2CO_2H$ or $PO_3H$; salts of long chain carboxylates such as potassium oleate, sodium laurate, potassium stearate, potassium caprolate, sodium palmatate and the like; alkali metal alkylbenzene sulfonates such as sodium nonylbenzene sulfonate and potassium dodecylbenzene sulfonate; alkali metal alkyl sulfates such as sodium dodecyl sulfate and alkali metal dialkyl sulfosuccinates such as sodium dihexyl sulfosuccinate and sodium dioctyl sulfosuccinate; salts of resin acids such as abietic acid and dihydroabietic acid. Also suitable are cationic surfactants such as alkyl ammonium or quaternary ammonium salts, e.g., dodecyl ammonium hydrochloride, dodecyl trimethyl quaternary ammonium chloride and the like, and ethoxylated fatty amines. Other suitable surfactants are described in McCutcheon's, supra. Also included in the aforementioned surfactants are oligomeric and polymerizable surfactants described at pages 319–322 of Blackley, *Emulsion Polymerization Theory and Practice*, John Wiley and Sons (1975). Examples of such oligomers include ammonium and alkali metal salts of functionalized oligomers sold by Uniroyal Chemical under the trade name "Polywet" and copolymers of acrylonitrile and acrylic acid having molecular weights less than 2000 which are prepared in the presence of chain terminating agents such as n-octyl mercaptan. Examples of polymerizable surfactants include sodium salts of 9- and 10-(acrylylamido)stearic acid and the like. Of the foregoing surfactants, the nonionic types are preferred, with ethoxylated alkyl phenol and ethoxylated fatty alcohols being most preferred. However, when the hydrophilic/hydrophobic polymer is cationic, it is desirable to use a cationic or nonionic surfactant. When the hydrophilic/hydrophobic polymer is anionic, it is desirable to employ an anionic or nonionic surfactant.

The mobility control agent of the present invention can be suitably prepared by dispersing the hydrophilic and hydrophobic monomers and the surfactant in an aqueous medium under conditions such that the components are uniformly distributed throughout the aqueous medium. Preferably, as stated hereinbefore, the surfactant is added to the polymerization recipe used to prepare the hydrophilic/hydrophobic polymer, and the recipe is then subjected to polymerization conditions. While the relative proportions of the hydrophilic/hydrophobic polymer and the surfactant are not particularly critical, it is generally desirable to employ proportions such that associations between the hydrophobic moieties of the polymer and the hydrophobic moieties of the surfactant are maximized. Accordingly, the hydrophilic-lipophilic balance (HLB) of the surfactant and the number and size of the polymer molecules are advantageously correlated such that at least two hydrophobic moieties of the molecules of the polymer can associate with the hydrophobic moieties of each particle (micelle) of the surfactant. Usually, the ratio of surfactant to hydrophilic/hydrophobic polymer is one that produces a viscosity at least twice that of a solution containing only the polymer. Preferably, the weight ratio of the polymer to surfactant is from about 20:1 to about 0.5:1, most preferably from about 10:1 to about 1:1. Normally, the concentrations of the polymer and surfactant in the mobility control fluid are from 100–10,000 ppm and 1 to 100 ppm respectively, depending upon the electrolyte content and temperature of the fluid.

The amount of mobility control agent in the aqueous medium being used as the mobility control fluid is sufficient to provide the desired increase in viscosity of the aqueous medium. Preferably, such amounts of agent range from about 0.01 to about 1.5 weight percent, most preferably from about 0.05 to about 1 weight percent, based on the aqueous medium. In addition to the hydrophilic/hydrophobic polymer and water-dispersible surfactant, the mobility control agent may contain or be used in combination with a non-polymeric, water-soluble electrolyte including salts of monovalent and divalent cations such as ammonium, alkali metal and alkaline earth metal chlorides, bromides, nitrates, sulfates, carbonates and the like; monobasic and dibasic acids such as hydrochloric, sulfuric and phosphoric; and monovalent bases such as sodium hydroxide and potassium hydroxide. Such electrolytes may be present in the aqueous media as in the case of the brines and other aqueous media containing water-soluble salts of various metals and other water-soluble electrolytes. Such aqueous media often contain from about 0.01 to about 20 weight percent of salts of alkali metals and alkaline earth metals. These electrolytes generally reduce the critical micelle concentration of the surfactant when added to an aqueous medium containing the surfactant. Thus, such electrolytes enhance hydrophobic association between the hydrophilic/hydrophobic polymer and the water-dispersible surfactant.

In addition, to the agent and electrolyte, the aqueous medium may contain a variety of other ingredients common to mobility control fluids, fracturing fluids, drilling muds, etc. The aqueous medium may also contain various additives such as antioxidants and antimicrobials, stabilizers and the like. An exemplary mobility control fluid comprises, in addition to the aforementioned mobility control agent, an antioxidant such as sodium thiosulfate or sodium bisulfite.

To increase the viscosity of an aqueous medium containing substantial amounts, e.g., up to about 5 weight percent based on the aqueous medium, of monovalent inorganic salts such as sodium chloride and up to 1 weight percent, usually from 0.0015 to 0.5 weight percent, of salts of polyvalent cations such as calcium and magnesium, it is preferred to employ (1) as the hydrophilic/hydrophobic polymer, (a) a nonionic copolymer of a water-soluble ethylenically unsaturated carboxamide such as acrylamide and a higher alkyl acrylate or methacrylate such as dodecyl methacrylate or (b) an anionic copolymer of sodium acrylate and higher alkyl acrylate or methacrylate, and (2) any suitable surface active agent as the surfactant. The viscosity increase in this aqueous medium is retained or increased at temperatures over the range from about 30° to about 80° C. In many instances, this viscosity increase is retained at temperatures substantially higher than 80° C. To increase the viscosity of an aqueous medium at a temperature of 60° to 80° C. and containing from about 10 to 15 weight percent of a monovalent salt, it is preferred to use one of the aforementioned nonionic or anionic copolymers with a nonionic surfactant having an HLB greater than 10, e.g., a dodecyl ether of polyethylene glycol containing 10 ethyleneoxy units per surfactant molecule. In contrast, to increase the viscosity of an aqueous medium at an ambient temperature and containing from about 0.1 to about 0.5 weight percent of monovalent salt, it is preferred to employ one of the aforementioned nonionic or anionic copolymers with a nonionic surfactant having an HLB less than 10 such as the dodecyl ether of a polyethylene glycol having 2 ethyleneoxy groups per surfactant molecule. Finally, to increase the viscosity of an aqueous medium containing from about 1 to about 5 weight percent of salts of polyvalent cations, e.g., calcium and/or magnesium in the form of salts such as calcium bromide, calcium chloride or magnesium sulfate, it is preferable to employ one of the aforementioned nonionic hydrophilic/hydrophobic copolymers in combination with a nonionic surfactant, especially a surfactant having an HLB greater than 10, e.g., the dodecyl ether of a polyethylene glycol having 5 ethyleneoxy groups per surfactant molecule.

In general, the type of application and the conditions characteristic of the application will determine the type and amount of surfactant employed, to give the desired viscosity response. For example, it is found that a nonionic surfactant having a low HLB, e.g., an HLB of 4 to 8, is advantageously employed in an aqueous medium having a relatively low salt concentration and moderate temperature. On the other hand, a nonionic surfactant having a high HLB, e.g., an HLB of 10-14, is advantageously employed in an aqueous medium having a relatively high salt concentration and high temperature. Moreover, the desired viscosity response for a given set of conditions can be achieved by adding a single surfactant having the desired HLB value or by adding a mixture of surfactants having different HLB values which combine to provide the desired HLB value.

The following examples are given to illustrate the invention and should not be construed as limiting its scope. Unless otherwise indicated, all parts and percentages are by weight.

I. General Procedure for Preparing Mobility Control Agent

A 295-ml citrate bottle is charged with 100 ml of an aqueous solution containing sodium dodecyl sulfate (NaDS) and a nonionic surfactant (NIS) in amounts as specified in the examples hereinafter. A specified amount of a higher alkyl methacrylate is then dispersed into the aqueous solution by adding the monomer to the bottle and stirring the contents until emulsification of the monomer is achieved and a clear solution is obtained. An aqueous solution containing water-soluble monomer(s) in specified amount is added to the bottle. Then (1) 2.5 ml of a solution of 2 percent of the pentasodium salt of (carboxymethylimino)bis(ethylenenitrilo)-tetraacetic acid (V-80) in 100 ml of aqueous acetic acid containing 16.9 ml acetic acid, and (2) 1 ml of a solution of 1.5 percent of azobisisobutyronitrile (AZO) in t-butyl alcohol are added sequentially to the bottle and stirred for a few minutes. When specified, isopropyl alcohol is then added as a chain transfer agent. The contents of the bottle are then increased to the specified weight by addition of deionized water and degassed by alternate cycles (5-10 cycles) of vacuum and nitrogen gas purge. The bottle is than capped and heated in a water bath at 60° C. for 16 hours in an end-over-end apparatus thereby effecting copolymerization of the monomers. Following polymerization, the contents of the bottles are cooled to room temperature and the mobility control agent is removed from the bottle as a thick aqueous solution (polymer gel).

For purposes of comparison, water-soluble polymers of the water-soluble monomers which polymers do not contain the higher alkyl methacrylate are prepared according to the foregoing procedure except that the higher alkyl methacrylate is omitted. Also for comparison water-soluble polymers which contain lower alkyl acrylates are similarly prepared.

Each of the aforementioned polymer gels (mobility control agent) is diluted with deionized water to form a stirrable solution and stirred for 3-5 hours to obtain a uniform solution. The solution is then adjusted to pH of 7.5 with a 2 percent sodium hydroxide solution and then diluted with deionized water to polymer concentration as specified usually about 0.5 percent. The solution is maintained at 23° C. for 3-4 hours to reach equilibrium.

The viscosity of the polymer solution is measured using an Ostwald viscometer or a Brookfield LVT or RVT viscometers with appropriate spindle and rpm as specified.

A solution of the polymer and salt is prepared by dissolving a specified amount of sodium chloride in the aforementioned polymer solution and then maintaining the solution for 2-3 hours to allow it to reach equilibrium. The viscosity of the solution of polymer and salt is then measured using a Brookfield LVT viscometer havng a UL adaptor.

Dilute polymer solution viscosity (relative viscosity) is measured using a capillary viscometer (Ostwald type) at various polymer and salt concentrations and at various temperatures as specified. Reduced viscosity is then calculated from relative viscosity.

The various polymer solutions and polymer/salt solutions are then tested for resistance factor by the tests described in the following tables.

Also for comparison, samples of polymers are prepared by the foregoing general procedure except that the nonionic surfactant is not present during polymerization. The resulting aqueous solution of polymer is combined with a specified nonionic surfactant. The resulting solution is diluted with deionized water and slowly agitated overnight to obtain a uniform solution of the polymer and surfactant. These polymer solutions are similarly tested for viscosity, resistance factor and shear stability.

EXAMPLE 1

Several mobility control agents (MC Agent A, B, C, D and E) are prepared according to the aforementioned general procedure using different polymerization formulations set forth in Table I. These MC agents are then tested for specific viscosity and intrinsic viscosity in the presence of different salts and various concentrations. The results of these tests are reported in Table II. For comparison, several compositions are prepared by the foregoing procedure except that no hydrophobic monomer is employed.

TABLE I

| MC Agent | Monomers[1], mole % AAM/AA/$C_{12}$MA | Formulation[2], grams | | | | | | |
|---|---|---|---|---|---|---|---|---|
| | | AAM | AA | $C_{12}$MA | NaDS | NIS | IPA | Total Wt. |
| A | 74.9/25/0.1 | 18.62 | 6.3 (a) | 0.09 | 2.5 | 2.0 (c) | — | 250 |
| B | 74.9/25/0.1 | 18.62 | 6.3 (b) | 0.09 | 2.5 | 2.5 (c) 2.5 (d) | — | 250 |
| C | 74.9/25/0.1 | 18.62 | 6.3 (a) | 0.09 | 2.5 | 2.0 (c) | — | 250 |
| D* | 75/25 | 18.92 | 6.3 (a) | — | 2.5 | 2.0 (c) | — | 250 |

TABLE I-continued

| MC Agent | Monomers[1], mole % AAM/AA/C$_{12}$MA | Formulation[2], grams | | | | | | |
|---|---|---|---|---|---|---|---|---|
| | | AAM | AA | C$_{12}$MA | NaDS | NIS | IPA | Total Wt. |
| E | 74.9/25/0.1 | 18.62 | 6.3 (b) | 0.09 | 2.5 | 1.0 (c) | 0.75 | 250 |

*Not a MC Agent of the invention.
[1]AAM—acrylamide
AA—acrylic acid
C$_{12}$MA—dodecyl methacrylate
[2]All quantities are given as 100% active.
AAM—acrylamide added as a 50% aqueous solution.
AA—acrylic acid wherein (a) indicates added as 50% aqueous solution adjusted to pH of 4.5 with sodium hydroxide and (b) indicates added as glacial acrylic acid.
C$_{12}$MA—dodecyl methacrylate added neat.
NaDS—sodium dodecyl sulfate added as 10% solution in water.
NIS—nonionic surfactant added neat wherein (c) indicates dodecanol condensed with 5 moles of ethylene oxide and (d) indicates dodecanol condensed with 2 moles of ethylene oxide.
IPA—isopropyl alcohol added neat.
Total Wt.—total weight of formulation achieved by adding deionized water to attain specified weight.

TABLE II

| Sample No. | MC Agent[1] Type | Reduced Viscosity[2] | Apparent Molecular Weight $\times 10^{-6}$[3] |
|---|---|---|---|
| 1 | A | 33.85 | 4.3 |
| 2 | B | 31.6 | — |
| 3 | C | 41.94 | 4.5 |
| C$_1$* | D | 22.62 | 5.0 |
| 4 | E | ND[4] | 1.5 |
| C$_2$* | PAM(a) | 27.6 | 7.05 |
| C$_3$* | PAM(b) | 15.19 | 3.24 |

*Not an example of this invention
[1]PAM(a) & PAM(b) are acrylamide/acrylic acid copolymers sold by The Dow Chemical Company under the tradenames PUSHER ® 1000 and PUSHER ® 500, respectively.
[2]Reduced viscosity is calculated from the measurement of relative viscosity of 0.1 gram of the MC Agent in 100 ml of a 3% solution of NaCl in water at 25° C. using an Ostwald capillary viscometer wherein $$\text{Reduced Viscosity} = \frac{\text{Relative Viscosity} - 1}{\text{Concentration of MC Agent in 100 ml of 3\% NaCl solution}}$$

and $$\text{Relative Viscosity} = \frac{t_p}{t_s}$$

where $t_p$ is flow rate of MC Agent solution through capillary and $t_s$ is flow rate of 3% NaCl solution.
[3]Molecular weight is determined from intrinsic viscosity using plots of specific viscosity versus concentration which are extrapolated to zero concentration and using the following equation:

$$\text{Molecular weight} = 0.8 \sqrt{\frac{\text{intrinsic viscosity}}{6.32 \times 10^{-5}}}$$

wherein specific viscosity = relative viscosity − 1.
[4]Calculated from a relative viscosity of 9.0 using a solution of 0.5% of MC Agent and 3% NaCl and a plot of relative viscosity vs. intrinsic viscosity, the latter being 5.57.

As evidenced by the data in Table II, the MC Agents of the present invention exhibit higher specific viscosities in salt solutions than (1) similar MC Agents which do not contain polymers having hydrophobic moieties (MC Agent D) or (2) conventional MC Agents (PAM(a) and PAM(b)).

EXAMPLE 2

The MC Agents as described in Table II are tested for resistance factor using the following test procedure and the results are reported in Table III.

The test procedure consists of injecting a solution containing the specified MC Agent and any other ingredients specified in Table III into and through a Berea sandstone core and measuring the pressure drop at a given flow rate through the core and then comparing this pressure drop with the pressure drop observed when a similar solution except that it does not contain the MC Agent is passed through the same core at the same flow rate. The ratio of the two pressure drops is called resistance factor which is represented by the equation:

$$R_f = \frac{\Delta P_{mc}}{\Delta P_{brine}}$$

at constant flow rate wherein $\Delta P_{mc}$ is the pressure drop at a given flow rate of brine containing the MC agent as it is passed through the core and $\Delta P_{Brine}$ is the pressure drop at the same flow rate of brine without the MC agent as the brine is passed through the core. The Berea sandstone core has a length of 2.54 cm and a diameter of 2.54 cm and a pore volume of 19 volume percent. $\Delta P_{mc}$ and $\Delta P_{Brine}$ are determined at flow rates of 0.04, 0.1, 0.2, 0.4 and 1 ml/min. Core permeability in millidarcies (md) is simultaneously determined using the foregoing procedure.

TABLE III

| Sample No. | MC Agent[1] | | Post-Added NIS[2], ppm | Salt[3], ppm | Permeability md | Resistance Factor[5] at flow rates of ml/min | | | | |
|---|---|---|---|---|---|---|---|---|---|---|
| | Type | Conc., ppm | | | | 0.04 | 0.1 | 0.2 | 0.4 | 1.0 |
| 1 | A | 500 | — | 30,000 (a) | 165 | 31.3 | 29.7 | 33.6 | 26.6 | 22.9 |
| 2 | A | 500 | 60 | 30,000 (a) | 194 | 10.3 | 10.0 | 10.2 | 11.1 | 12.6 |
| 3 | A | 500 | 60 | 33,000 (b) | 150 | 16.3 | 14.0 | 12.1 | 11.4 | NM |
| 4 | A | 500 | 60 | 50,000 (a) | 194 | 57.8 | 39.5 | 27.9 | 21.1 | 19.1 |
| 5 | B | 500 | — | 30,000 (a) | 294 | 20.3 | 16.2 | 14.7 | 14.9 | 15.7 |
| 6 | C | 500 | 60 | 33,000 (b) | 190 | 12.7 | 12.2 | 14.8 | 14.9 | NM |
| 7* | D | 500 | 60 | 33,000 (b) | 225 | 8.0 | 6.4 | 5.3 | 4.5 | NM |
| 8* | P-1 | 500 | — | 30,000 (a) | 210 | 7.8 | 7.2 | 7.5 | 9.1 | 13.0 |
| 9* | P-1 | 500 | — | 50,000 (a) | 210 | 6.2 | 6.3 | 7.1 | 9.2 | 13.9 |
| 10* | P-1 | 500 | — | 33,000 (b) | 252 | 6.3 | 5.7 | 4.3 | 4.2 | NM |
| 11 | E | 1000 | — | 30,000 (a) | 326 | 16.6 | 13.4 | 10.9 | 8.7 | NM |

TABLE III-continued

| Sample | MC Agent[1] | | Post-Added NIS[2], ppm | Salt[3], ppm | Permeability md | Resistance Factor[5] at flow rates of ml/min | | | | |
|---|---|---|---|---|---|---|---|---|---|---|
| No. | Type | Conc., ppm | | | | 0.04 | 0.1 | 0.2 | 0.4 | 1.0 |
| 12* | P-5 | 1000 | — | 30,000 (a) | 254 | 9.7 | 10.0 | 10.3 | 13.0 | NM |

*Not an example of the invention.
[1]Mobility control agent as described in Table I and Table II in parts per million based on total solution.
[2]Nonionic surfactant (decanol condensed with 5 moles of ethylene oxide)in ppm based on total solution added to solution of MC Agent subsequent to polymerization.
[3]Salt added in ppm based on total solution wherein (a) is NaCl and (b) is a mixture of 10 parts NaCl and 1 part of $MCl_2$ wherein M is Ca or other divalent metal cation.
[4]Determined by the test procedure described before in this example.
[5]Determined by the test procedure described before in this example. NM means not measured.

As evidenced by the data of Table III, the MC agents of the present invention (Samples Nos. 1-6 and 11) exhibit significantly higher resistance factors over a wide range of flow rates than do conventional MC agents (Sample Nos. 8-10 and 12) or a MC agent (Sample No. 7) that is similar to the MC agents of this invention except that it does not contain hydrophobic moieties in the polymer component.

EXAMPLE 3

Several mobility control agents (MC Agent F, G and H) are prepared according to the aforementioned general procedure using the different formulations set forth in Table IV.

TABLE IV

| MC Agent | Monomers[1], mole % AAM/AA/$C_{12}$MA | Formulation[2], grams | | | | | | |
|---|---|---|---|---|---|---|---|---|
| | | AAM | AA | $C_{12}$MA | NaDS | NIS | IPA | Total Wt. |
| F | 74.9/25/0.1 | 18.62 | 6.3 (a) | 0.09 | 2.5 | 0.5 (c) | — | 250 |
| G* | 75/25 | 18.9 | 6.3 (a) | — | 2.5 | — | — | 250 |
| H | 74.9/25/0.1 | 18.62 | 6.3 (a) | 0.09 | 2.5 | 1.0 (c) | — | 250 |

*Not a MC Agent of the invention.
[1]Same as [1] in Table I.
[2]Same as 2 in Table I.

The resulting solutions of the aforementioned MC Agents are diluted to 0.5 percent concentration by addition of deionized water and then adjusted to a pH of 7.5 by addition of a dilute solution of NaOH. The resulting diluted solutions are then further diluted to 0.1 percent concentration of the MC Agent by addition of deionized water. Sodium chloride is then added to a portion of each solution to provide a salt concentration of 3 percent in each solution. The solutions are allowed to equilibrate at room temperature for 3 hours, and the Brookfield viscosity of each solution is measured and the results are reported in Table V.

TABLE V

| Sample No. | MC Agent[1] type | Brookfield Viscosity[2] cps | |
|---|---|---|---|
| | | Deionized Water | 3% NaCl |
| 1 | F | 232 | >100 |
| C* | G | 137.2 | 6.2[3] |
| 2 | H | 242 | 25 |

*Not an example of this invention.
[1]MC Agent as described in TABLE IV
[2]Brookfield viscosity using a Brookfield LVT viscometer and #2 spindle operating at 30 rpm and 25° C.
[3]Brookfield LVT viscometer with UL Adaptor operating at 6 rpm and 25° C. is used.

As evidenced by the data of Table V, MC Agents of this invention (Sample Nos. 1 and 2) do not lose as much viscosity in the presence of salt as do conventional MC Agents (Sample No. C) which do not contain hydrophobic moieties.

EXAMPLE 4

Mobility control agents (MC Agents I, J, K and L) are prepared according to the aforementioned general procedure using formulations having varied amounts of hydrophobic monomer, emulsifying surfactant and nonionic surfactant as specified in Table VI.

TABLE VI

| MC Agent | Monomers[1], mole % AAM/AA/$C_{12}$MA | Formulation[2], grams | | | | | | |
|---|---|---|---|---|---|---|---|---|
| | | AAM | AA | $C_{12}$MA | NaDS | NIS | IPA | Total Wt. |
| I | 74.9/25/0.1 | 17.72 | 6.0 (a) | 0.0847 | 1.0 | 0.7 (c) | — | 158 |
| J* | 75/25 | 17.72 | 6.0 (a) | — | 1.0 | 0.7 (c) | — | 158 |
| K | 74.95/25/0.05 | 17.72 | 6.0 (a) | 0.0424 | 0.33 | 0.234 (c) | — | 158 |
| L* | 75/25 | 17.72 | 6.0 (a) | — | 0.33 | 0.234 (c) | — | 158 |

*Not a MC Agent of this invention.
[1]Same as [1] in Table I.
[2]Same as [2] in Table I.

The resulting solutions of the aforementioned MC Agents are diluted to 0.5 percent concentration by addition of deionized water and then adjusted to a pH of 7.5 by adding dilute NaOH. A sodium chloride solution is added to provide a salt concentration of 3 percent and 0.1 g of MC Agent per 100 ml of solution. Relative viscosities of the resulting solutions of MC Agent and salt are determined using the procedure described in Table II. Reduced viscosities are then calculated for the solutions and reported in Table VII.

TABLE VII

| Sample No. | MC Agent[1] Type | conc., ppm | Reduced Viscosity[2] in 3% NaCl Solution at 25° C. |
|---|---|---|---|
| 1 | I | 0.025 | 20.1 |
| 2 | I | 0.05 | 24.7 |
| 3 | I | 0.075 | 27.7 |
| 4 | I | 0.1 | 32.4 |
| $C_1$* | J | 0.025 | 17.5 |
| $C_2$* | J | 0.05 | 19.1 |
| $C_3$* | J | 0.075 | 21.1 |
| $C_4$* | J | 0.1 | 23.0 |
| 5 | K | 0.025 | 19.9 |
| 6 | K | 0.05 | 23.7 |
| 7 | K | 0.075 | 26.6 |
| 8 | K | 0.1 | 29.9 |
| $C_5$* | L | 0.025 | 18.5 |
| $C_6$* | L | 0.05 | 20.4 |
| $C_7$* | L | 0.075 | 22.4 |
| $C_8$* | L | 0.1 | 24.5 |

*Not an example of the invention.
[1] As described in Table VI.
[2] As described in [2] of Table II.

As evidenced by the data of Table VII, the MC Agents of the present invention (Sample Nos. 1-8) exhibit significantly higher reduced viscosities over a substantial range of MC Agent concentration than do MC Agents that do not contain the hydrophobic moieties in the polymer component (Sample Nos. $C_1$-$C_8$).

EXAMPLE 5

Mobility control agents (MC Agent M, N, O and P) are prepared according to the aforementioned general procedure using different formulations as described in Table VIII.

TABLE VIII

| MC Agent | Monomers[1], mole % AAM/AA/$C_{12}$MA | AAM | AA | $C_{12}$MA | NaDS | NIS | IPA | Total Wt. |
|---|---|---|---|---|---|---|---|---|
| M | 74.9/25/0.1 | 17.74 | 6.0 (a) | 0.0848 | 1 | 1.643 (c) | — | 158 |
| N* | 75/25/— | 17.76 | 6.0 (a) | — | 1 | 1.643 (c) | — | 158 |
| O | 74.8/25/0.2 | 17.71 | 6.0 (a) | 0.1696 | 2.33 | 1.643 (c) | — | 158 |
| P* | 75/25/— | 17.76 | 6.0 (a) | — | 2.33 | 1.643 (c) | — | 158 |

*Not a MC Agent of this invention.
[1] Same as [1] in Table I.
[2] Same as [2] in Table I.

The resulting solutions of the aforementioned MC Agents are diluted to 0.5 percent concentration by addition of deionized water and then adjusted to a pH of 7.5 by adding dilute NaOH. Sodium chloride is added to provide a salt concentration of 3 percent and 0.1 g of MC Agent per 100 ml of solution. Each solution is allowed to equilibrate for 3 hours at room temperature. Relative viscosities of the resulting solutions of MC Agent and salt are determined at different temperatures using the procedure described in Table II. Reduced viscosities are then calculated for the solutions and reported in Table IX.

TABLE IX

| Sample No. | MC Agent[1] Type | Conc., ppm | Reduced Viscosity[2] in 3% NaCl Solution 25° C. | 50° C. | 80° C. |
|---|---|---|---|---|---|
| 1 | M | 1000 | 30.6 | 28.1 | 24.2 |
| $C_1$* | N | 1000 | 26.0 | 23.7 | 19.7 |
| 3 | O | 1000 | 39.0 | 35.1 | 31.4 |
| $C_2$* | P | 1000 | 26.0 | 23.4 | 19.4 |

*Not an example of this invention.
[1] As described in Table VIII.
[2] Same as [2] in Table II.

As evidenced by the data in Table IX, MC Agents (Sample Nos. 1 and 2) of the present invention exhibit greater reduced viscosities at all of the represented temperatures than do MC Agents (Sample Nos. $C_1$ and $C_2$) which do not contain hydrophobic moieties in the polymer component.

EXAMPLE 6

Mobility control agents (MC Agents Q, R, S, T, U and V) are prepared according to the aforementioned general procedure using formulations having different acrylic acid concentrations as specified in Table X.

TABLE X

| MC Agent | Monomers[1], mole % AAM/AA/$C_{12}$MA | AAM | AA | $C_{12}$MA | NaDS | NIS | IPA | Total Wt. |
|---|---|---|---|---|---|---|---|---|
| Q | 89.8/10/0.2 | 21.7 | 2.4 (a) | 0.1696 | 2.5 | 1.923 (c) | 0.625 | 238 |
| R* | 90/10/— | 21.32 | 2.4 (a) | — | 2.5 | 1.923 (c) | 0.625 | 237 |
| S | 49.8/50/0.2 | 11.8 | 12 (a) | 0.1696 | 2.5 | 1.923 (c) | 0.625 | 239 |
| T* | 50/50/— | 11.84 | 12 (a) | — | 2.5 | 1.923 (c) | 0.625 | 238 |
| U | 9.8/90/0.2 | 2.32 | 21.62 (a) | 0.1696 | 2.5 | 1.923 (c) | 0.625 | 241 |
| V* | 10/90/— | 2.37 | 21.62 (a) | — | 2.5 | 1.923 (c) | 0.625 | 239 |

*Not a MC Agent of this invention.
[1] Same as [1] in Table I.
[2] Same as [2] in Table I.

The resulting solutions of the aforementioned MC Agents are adjusted to a pH of 7.5 with NaOH and diluted to 0.5 percent concentration by addition of deionized water. Sodium chloride is added to a portion of each solution to provide a salt concentration of 4 percent. Molecular weights for the MC Agents are determined to be 2.5 million from intrinsic viscosity determinations as described in footnote[3] of Table I. Brookfield viscosities are then measured and are reported in Table XI.

TABLE XI

| Sample No. | MC Agent[1] Type | Brookfield Viscosity[2], cps in Deionized Water | 4% NaCl |
|---|---|---|---|
| 1 | Q | 144 | 2400 |
| $C_1$* | R | 100 | 16 |
| 2 | S | 524 | 118 |
| $C_2$* | T | 484 | 22 |
| 3 | U | 400 | 50 |

TABLE XI-continued

| Sample No. | MC Agent[1] Type | Brookfield Viscosity[2], cps in Deionized Water | 4% NaCl |
|---|---|---|---|
| C3* | V | 410 | 19 |

*Not an example of the invention.
[1]MC Agents as described in Table X.
[2]Brookfield LVT using #2 spindle at 30 rpm and room temperature.

As evidenced by the data of Table XI, the MC Agents (Samples Nos. 1–3) of the present invention have higher viscosities in the presence of salt over a wide range of acrylic acid concentrations as compared to the MC Agents (Sample Nos. $C_1$–$C_3$) that do not contain hydrophobic moieties.

EXAMPLE 7

Mobility control agents (MC Agents W, X, Y, Z, AA, BB, CC, DD and EE) are prepared according to the aforementioned general procedure using formulations having different concentrations of acrylic acid and dodecyl methacrylate as specified in Table XII.

TABLE XII

| MC Agent | Monomers[1], mole % AAM/AA/$C_{12}$MA | Formulation[2], grams | | | | | | |
|---|---|---|---|---|---|---|---|---|
| | | AAM | AA | $C_{12}$MA | NaDS | NIS | IPA | Total Wt. |
| W | 89/10/1 | 21.01 | 2.4 (a) | 0.848 | 2.5 | 1.923 (c) | 1.5 | 243 |
| X | 89.5/10/0.5 | 21.2 | 2.4 (a) | 0.424 | 2.5 | 1.923 (c) | 1.5 | 240 |
| Y* | 90/10/— | 21.32 | 2.4 (a) | — | 2.5 | 1.923 (c) | 1.5 | 237 |
| Z | 49/50/1 | 11.6 | 12 (a) | 0.848 | 2.5 | 1.923 (c) | 1.5 | 244 |
| AA | 49.5/50/0.5 | 11.73 | 12 (a) | 0.424 | 2.5 | 1.923 (c) | 1.5 | 241 |
| BB* | 50/50/— | 11.85 | 12 (a) | — | 2.5 | 1.923 (c) | 1.5 | 238 |
| CC | 9/90/1 | 2.13 | 21.62 (a) | 0.848 | 2.5 | 1.923 (c) | 1.5 | 245 |
| DD | 9.5/90/0.5 | 2.25 | 21.62 (a) | 0.424 | 2.5 | 1.923 (c) | 1.5 | 242 |
| EE* | 10/90/— | 2.37 | 21.62 (a) | — | 2.5 | 1.923 (c) | 1.5 | 249 |

*Not a MC Agent of this invention.
[1]Same as [1] in Table I.
[2]Same as [2] in Table I.

The resulting solutions of the aforementioned MC Agents are adjusted to a pH of 7.5 with NaOH and diluted to 0.5 percent concentration by addition of deionized water. Molecular weights for the MC Agents are determined to be 1.2 million from intrinsic viscosity determinations as described in footnote[3] of Table I. Sodium chloride is added to a portion of each solution to provide a salt concentration of 4 percent. Brookfield viscosities of the resulting solutions are determined and the results are reported in Table XIII.

TABLE XIII

| Sample No. | MC Agent[1] Type | Brookfield Viscosity[2], cps in Deionized Water | 4% NaCl |
|---|---|---|---|
| 1 | W | 1400 (a) | 2400 (b) |
| 2 | X | 130 (a) | 1500 (b) |
| C1* | Y | 42 (a) | 10 (c) |
| 3 | Z | 194 (a) | 182 (c) |
| 4 | AA | 156 (a) | 135 (c) |
| C2* | BB | 134 (a) | 12 (c) |
| 5 | CC | 180 (a) | 114 (c) |
| 6 | DD | 144 (a) | 105 (c) |
| C3* | EE | 128 (a) | 12 (c) |

*Not an example of this invention.
[1]MC Agent as described in Table XII.
[2]Brookfield viscosity at 25° C. wherein (a) indicates Brookfield RVT, #3 spindle operating at 50 rpm, (b) indicates Brookfield LVT, #3 spindle operating at 30 rpm and (c) indicates Brookfield LVT, #2 spindle operating at 30 rpm.

As evidenced by the data of Table XIII, the presence of hydrophobic moieties in the polymer component of the MC Agent has a substantial effect on solution viscosity even at relatively lower molecular weights. However, the data of Table XIII shows that, at lower molecular weight, a greater concentration of hydrophobic moieties is required to produce the desired increase in solution viscosities.

EXAMPLE 8

Mobility control agents (MC Agents FF, GG, HH, II and JJ) are prepared according to the aforementioned general procedure using formulations using different amounts of hydrophobic monomer and different types of nonionic surfactants as specified in Table XIV.

TABLE XIV

| MC Agent | Monomers[1], mole % AAM/$C_{12}$MA | Formulation[2], grams | | | | | |
|---|---|---|---|---|---|---|---|
| | | AAM | $C_{12}$MA | NaDS | NIS | IPA | Total Wt. |
| FF* | 100/— | 25 | — | 2.5 | 7.0 (a) | — | 250 |
| GG | 99.75/0.25 | 24.94 | 0.2237 | 2.5 | 7.0 (a) | — | 250 |
| HH | 99.5/0.5 | 24.72 | 0.424 | 2.5 | 7.0 (a) | — | 250 |
| II | 99.75/0.25 | 24.94 | 0.2225 | 2.5 | 7.0 (b) | — | 250 |
| JJ | 99.75/0.25 | 24.94 | 0.2225 | 2.5 | 7.0 (c) | — | 250 |

*Not a MC Agent of this invention.
[1]AAM—acrylamide
$C_{12}$MA—dodecyl methacrylate
[2]NaDS—sodium dodecyl sulfate
NIS—nonionic surfactant wherein (a) indicates 7 parts of dodecanol condensed with 5 moles of ethylene oxide ($C_{12}(EO)_5$), (b) indicates 5 parts of $C_{12}(EO)_5$ and 2 parts of dodecanol condensed with 2 moles of ethylene oxide and (c) indicates 3.5 parts of $C_{12}(EO)_5$ and 3.5 parts of octadecanol condensed with 5 moles of ethylene oxide.

The resulting solutions of the aforementioned MC Agents are drum-dried at 175° C.–180° C. and then dissolved at different concentrations in concentrated HCl and in phosphoric acid. These resulting solutions of MC Agents in the specified acids are allowed to equilibrate overnight and the Brookfield viscosity of each solution is measured. The results of these measurements are recorded in Table XV.

TABLE XV

| Sample No. | MC Agent[1] Type | MC Agent[1] Conc., % | Brookfield Viscosity[2], cps in 15% HCl | Brookfield Viscosity[2], cps in 50% H$_3$PO$_4$ |
|---|---|---|---|---|
| C$_1$* | FF | 0.25 | 17 | 160 |
| 1 | GG | 0.25 | 95 | 440 |
| 2 | HH | 0.25 | 167 | 900 |
| 3 | II | 0.25 | 825 | NM |
| 4 | JJ | 0.25 | 4250 (a) | >5000 (a) |

*Not an example of the invention.
[1]MC Agent as described in Table XIV wherein % concentration is based on total weight of solution being measured for Brookfield Viscosity.
[2]Brookfield Viscosity using Brookfield LVT, #2 spindle operating at 30 rpm and 25° C. except (a) which indicates operating at 6 rpm. NM means not measured.

As evidenced by the data of Table XV, the acid solutions of the MV Agents (Sample Nos. 1, 2, 3 and 4) of this invention exhibit substantially higher viscosities than do acid solutions of MC Agent (Sample No. C$_1$), which does not contain hydrophobic moieties in the polymer component.

EXAMPLE 9

Following the aforementioned general procedure except substituting 3-acrylamido-2-methylpropane sulfonic acid for acrylic acid, several mobility control agents are prepared and tested for viscosity and found to exhibit properties similar to the aforementioned mobility control agents of the invention which employ acrylic acid.

EXAMPLE 10

Following the aforementioned general procedure except substituting t-butyl styrene for dodecyl methacrylate, several mobility control agents are prepared and tested for viscosity. These mobility control agents are found to exhibit viscosity enhancing properties in the presence of NaCl similar to those properties of the dodecyl methacrylate polymers. It is found, however, that from about 0.25 to 0.5 mole percent of t-butyl styrene is required to produce the same viscosity enhancing property as 0.1 to 0.2 mole percent of dodecyl methacrylate produces. The t-butyl styrene polymer exhibits no tendency to hydrolyze.

What is claimed is:

1. An enhanced oil recovery process which comprises forcing an aqueous flooding medium from an injection well through a subterranean formation toward a producing well wherein the flooding medium contains a mobility control agent which is soluble in an aqueous flooding medium, said agent comprising a hydrophilic/hydrophobic polymer having hydrophobic moieties and a water-dispersible, nonionic surfactant having hydrophobic groups that are capable of associating with the hydrophobic moieties of the polymer wherein the proportion of the polymer and the surfactant is such that, at ambient conditions, water containing 0.5 weight percent of the agent has a viscosity at least twice the viscosity of water, said agent having been prepared by carrying out the polymerization to form the polymer in the presence of the nonionic surfactant, the ratio of the surfactant to the polymer in said agent being sufficient to provide a viscosity at least twice that of an aqueous solution containing only the polymer, said hydrophobic polymer is being a copolymer of a said hydrophilic/water-soluble monomer and a water-insoluble monomer selected from the group consisting of higher alkyl ester of α,β-ethylenically unsaturated carboxylic acids wherein alkyl has from 8 to 20 carbons, alkylaryl esters of ethylenically unsaturated carboxylic acids, N-alkylethylenically unsaturated amides wherein alkyl has from 8 to 20 carbon atoms; vinyl alkylates wherein alkyl has at least 8 carbons and ar-alkyl styrenes wherein alkyl has at least 4 carbons.

2. The enhanced oil recovery process of claim 1 wherein the flooding medium contains a water-soluble, non-polymeric electrolyte which can reduce the critical micelle concentration of the surfactant when the electrolyte is added to an aqueous solution of the surfactant.

3. The enhanced oil recovery process of claim 2 which comprises forcing an aqueous flooding medium from an injection well through a subterranean formation toward a producing well wherein the flooding medium contains an aqueous composition having increased viscosity comprising an aqueous medium having dispersed therein (1) the agent described in claim 2 in an amount sufficient to increase the viscosity of said aqueous medium and (2) an amount of a water-soluble, non-polymeric electrolyte which is sufficient to increase the viscosity of the thickened aqueous composition.

4. The process of claim 2 wherein the electrolyte is an acid or a base.

5. enhanced oil recovery process of claim 1 wherein the weight ratio of the polymer to surfactant is from about 20:1 to about 0.5:1, said polymer being a copolymer of from about 40 to about 99.9 mole percent of acrylamide, from 0 to about 50 mole percent of acrylic acid, and from about 0.1 to about 10 mole percent of an alkyl methacrylate or acrylate wherein alkyl has from 8 to 12 carbon atoms or an ar-alkyl styrene wherein alkyl has from 4 to 8 carbons, said polymer having a weight average molecular weight in the range from about 800,000 to about 3 million.

6. The process of claim 1 wherein the aqueous flooding medium contains from about 100 to about 10,000 ppm of the polymer and from about 1 to about 100 ppm of the surfactant, said surfactant being an alkyl polyethyleneoxy glycol monoether wherein alkyl has from 8 to 20 carbon atoms and there are from 1 to 12 ethyleneoxy groups per molecule of surfactant.

7. The process of claim 1 wherein the flooding medium contains from about 0.01 to about 1 weight percent of the polymer and from about 0.0015 to about 0.5 weight percent of the surfactant.

8. The process of claim 1 wherein the flooding medium contains from about 0.025 to about 5 weight percent of the mobility control.

9. The process of claim 1 wherein the polymer is a copolymer of from about 60 to about 99.75 mole percent of acrylamide, from about 0 to about 30 mole percent of acrylic acid and from about 0.25 to about 10 mole percent of t-butyl styrene.

10. The process of claim 1 wherein the nonionic surfactant is an alkyl polyethyleneoxy glycol monoether or alkylaryl polyethyleneoxy glycol monoether wherein alkyl has from 8 to 20 carbons and from about 1 to 20 ethyleneoxy groups per polymer molecule.

11. An enhanced oil recovery process which comprises forcing an aqueous flooding medium from an injection well through a subterranean formation toward a producing well wherein the flooding medium contains (1) a mobility control agent which is soluble in an aqueous flooding medium, said agent comprising a hydrophilic/hydrophobic polymer having hydrophobic moieties and a water-dispersible, non-ionic surfactant having hydrophobic groups that are capable of associating with the hydrophobic moieties of the polymer wherein the proportion of the polymer and the surfactant is such that, at ambient conditions, water containing 0.5 weight percent of the agent has a viscosity at least twice the viscosity of water, said agent having been prepared by carrying out the polymerization to form the polymer in the presence of the nonionic surfactant, the ratio of the surfactant to the polymer in said agent being sufficient to provide a viscosity at least twice that of an aqueous solution containing only the polymer and (2) a water-soluble, non-polymeric electrolyte which can reduce the critical micelle concentraion of the surfactant when the electrolyte is added to an aqueous solution of the surfactant, said hydrophilic/hydrophobic polymer being (a) a copolymer of from about 40 to about 99.9 mole percent of acrylamide, from 0 to about 50 mole percent of acrylic acid, and from about 0.1 to about 10 mole percent of an alkyl methacrylate or acrylate wherein alkyl has from 8 to 12 carbon atoms or an ar-alkyl styrene wherein alkyl has from 4 to 8 carbons and (b) having a weight average molecular weight in the range from about 800,000 to about 3 million and said surfactant being an alkyl polyethyleneoxy glycol monoether wherein alkyl has from 8 to 20 carbon atoms and there are from 1 to 12 ethyleneoxy groups per molecule of surfactant.

12. The enhanced oil recovery process of claim 11 which comprises forcing an aqueous flooding medium from an injection well through a subterranean formation toward a producing well wherein the flooding medium contains from about 0.01 to about 1 weight percent of the copolymer and from about 0.0015 to about 0.5 weight percent of the monoether and from about 0.01 to about 20 weight percent of an alkali metal salt or an alkaline earth metal salt.

13. The enhanced oil recovery process of claim 11 which comprises forcing an aqueous flooding medium from an injection well through a subterranean formation toward a producing well wherein the polymer is a copolymer of from about 60 to about 99.9 mole percent of acrylamide, from 0 to about 30 mole percent of acrylic acid and from about 0.1 to about 10 weight percent of dodecyl methacrylate and the surfactant is a dodecyl polyethyleneoxy glycol monoether wherein the monoether has about 1 to 10 ethyleneoxy groups per molecule.

14. The process of claim 13 wherein the copolymer is a copolymer from about 99 to about 99.9 mole percent of acrylamide and from about 0.1 to about 1 weight percent of dodecyl methacrylate and the monoether has 5 ethyleneoxy groups per molecule.

15. The process of claim 11 wherein the electrolyte is a salt of a monovalent cation which salt is present in an amount from about 0.1 to about 15 weight percent based on the aqueous composition.

16. The process of claim 15 wherein the salt is sodium chloride or potassium chloride or a mixture thereof.

17. The process of claim 11 wherein the electrolyte is a salt of a divalent metal which salt is present in an amount from about 0.01 to about 10 weight percent based on the composition.

18. The process of claim 17 wherein the divalent metal is calcium, magnesium or a mixture thereof.

* * * * *